United States Patent Office 2,765,834
Patented Oct. 9, 1956

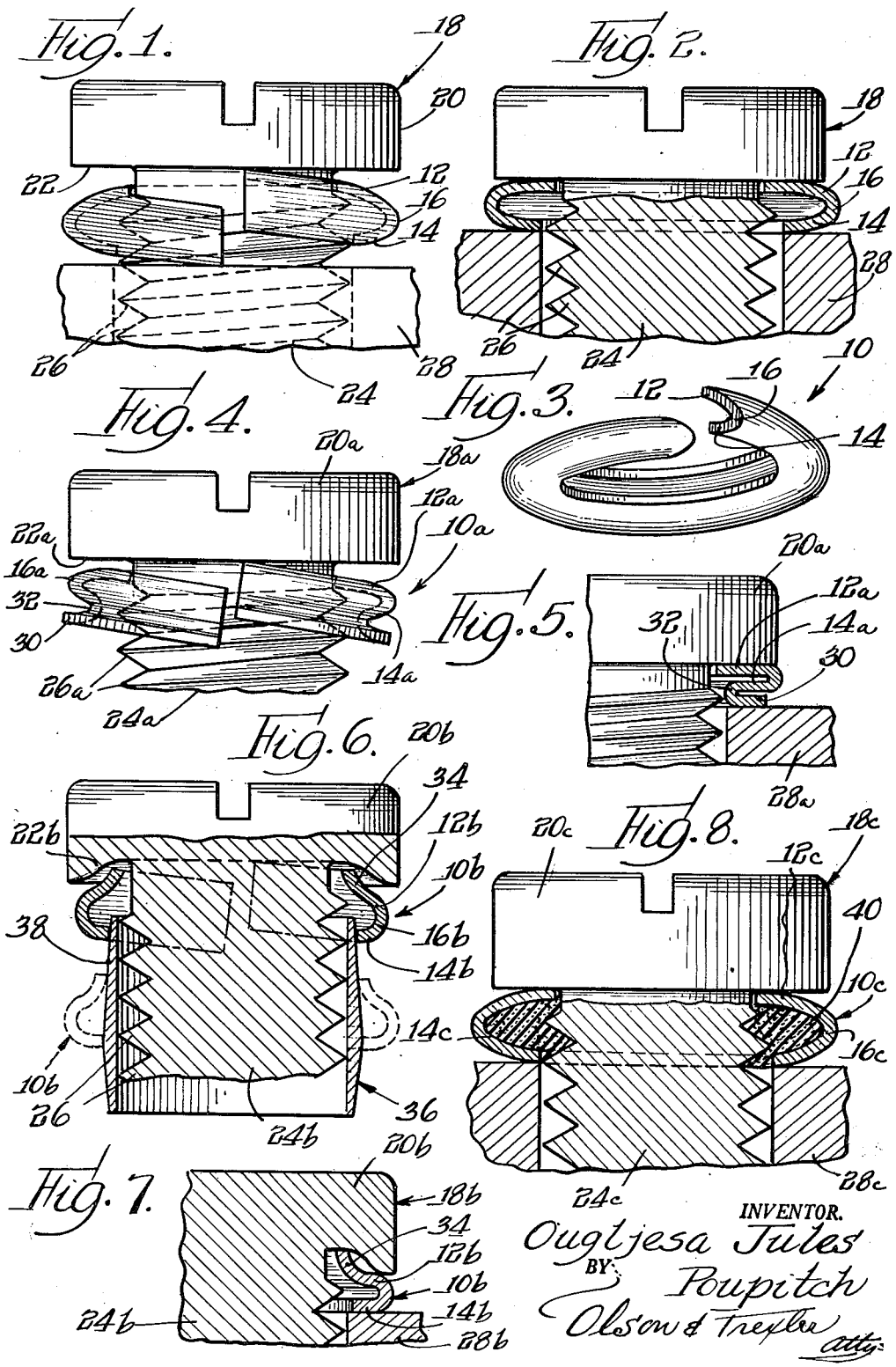

2,765,834

HELICAL SPLIT LOCK WASHER COMPRISING INTERCONNECTED HELICAL FLANGE MEANS

Ougljesa Jules Poupitch, Itasca, Ill., assignor to Illinois Tool Works, Chicago, Ill., a corporation of Illinois Application May 4, 1955, Serial No. 505,981

4 Claims. (Cl. 151—37)

The present invention relates to novel lock washers, and more particularly to novel lock washers of the split-ring type.

An object of the present invention is to provide a novel split-ring sheet material lock washer which may be easily interconnected in preassembled relationship with a rotary threaded fastener member such as a screw.

A further object of the present invention is to provide a novel lock washer of the above described type which has improved locking characteristics as compared to split-ring lock washers now in general use.

More specifically, it is an object of the present invention to provide a sheet material helically twisted split-ring lock washer member and which is constructed so as to offer a relatively great resistance to axial collapsing of its helical formation, and which is constructed so that it may be further axially compressed after the helical shape thereof has been flattened, whereby to provide a relatively great resistance to unauthorized retrograde movement of the fastener member.

Another object of the present invention is to provide a novel lock washer of the above described type which also includes means for sealing threads of a fastener member or a workpiece opening when the washer is clamped against the workpiece.

Other objects and advantages of the present invention will become apparent from the following description and the accompanying drawings wherein:

Fig. 1 is a fragmentary elevational view showing a lock washer embodying the principles of this invention disposed in preassembled relationship with a screw member;

Fig. 2 is a partial sectional view showing the washer and screw member assembly clamped against a workpiece;

Fig. 3 is a perspective view showing the lock washer of Fig. 1;

Fig. 4 is an elevational view showing a lock washer embodying a modified form of the present invention assembled with a screw member;

Fig. 5 is a fragmentary sectional view showing the lock washer of Fig. 4 clamped against a workpiece;

Fig. 6 is a partial sectional view showing a lock washer embodying another modified form of the present invention and the manner in which the lock washer may be assembled with a screw member;

Fig. 7 is a fragmentary sectional view showing the lock washer of Fig. 6 clamped against a workpiece;

Fig. 8 is a partial sectional view showing a lock washer which incorporates sealing means assembled with a screw member and initially applied to a workpiece.

Referring now more specifically to the drawings wherein like parts are designated by the same materials throughout the various figures, a lock washer 10 embodying the principles of this invention is shown in Figs. 1, 2 and 3. The lock washer is preferably formed from a strip of sheet spring steel of substantially uniform thickness and width throughout its length. The washer 10 includes a first flange 12, a second flange 14 and a bight portion 16 integrally joining the flanges. The flanges and bight portion are helically twisted in the manner shown, and the flanges extend generally radially inwardly from the bight portion and are disposed in axially spaced and oppositely flaring relationship with respect to each other. It should be noted that the flange 12 extends radially inwardly beyond the inner margin of the flange 14 for the purpose described below.

The washer 10 is adapted to be interconnected in preassembled relationship with a threaded rotary fastener member such as a screw member 18. The screw member has a head portion 20 with a generally radially extending clamping face 22, and an axially extending shank 24 having helical thread convolutions 26 formed thereon. The washer 10 may be assembled with the screw member in the manner described below so that the flange 12 is adjacent the clamping face 22. It should be noted that the internal diameter of the flange 12 is less than the outside diameter of the thread convolutions 26 so that the flange 12 is adapted to overlie the generally radially projecting thread convolution adjacent the clamping face 22 to retain the washer in assembled relationship with the screw member. It should also be noted that the internal diameter of the flange 14 is greater than the outside diameter of the thread convolutions 26 so that this flange avoids interfering with the thread convolution.

When the screw and washer are initially applied to a workpiece 28 as shown in Fig. 1, only the opposite end portions of the washer engage the clamping face and workpiece respectively so that the screw member may initially be relatively easily tightened. As the screw member is tightened, the helical formation of the washer is axially collapsed so that the edges of the flanges 12 and 14 progressively engage the clamping face 22 and the workpiece and act in combination with the spring action of the washer to provide increasing resistance to rotation of the screw member. It should be noted that the oppositely flaring relationship of the flanges 12 and 14 serves materially to increase the stiffness of the washer or the resistance of the washer to axial collapsing, and this resistance is even further increased by the generally axially extending relationship of the folded or bight portion 16 whereby the locking power of the washer is substantially improved. The locking effectiveness of the washer is even further increased by reason of the fact that the flanges 12 and 14 may be collapsed toward each other upon tightening of the screw member to provide an additional spring force tending to lock the screw member against unauthorized retrograde movement.

Figs. 4 and 5 show another embodiment of the present invention which is similar to the above described structure as indicated by the application of identical reference numerals with the suffix "a" added to corresponding elements. In this embodiment the stiffness and, therefore, the locking power of the washer is increased by providing the washer with a third generally radially extending and axially flaring flange 30 which is integrally joined to the inner margin of the flange 14a by a bight portion 32. It should be noted that in this embodiment the flange 12a projects radially inwardly of the bight portion 32 for interconnecting the washer with the screw member.

Figs. 6 and 7 show a washer embodying another modified form of the present invention, which washer is similar to the above described structures as indicated by the application of identical reference numerals with the suffix "b" added to corresponding elements. The washer 10b differs from the washer 10 in that the stiffness and, therefore, the locking power thereof is increased by providing the flange 12b with a generally axially extending free marginal portion 34. This washer is particularly adapted for use in combination with a screw member having its clamping face 22b undercut in the manner shown for accommodating the axially extending flange portion 34. As in the above described embodiments, the inner diameter of the flange portion 34 is substantially less than the inner diameter of the flange 14b for overlying a thread convolution and retaining the washer in assembled relationship with the screw member.

Fig. 6 also illustrates the manner in which the washer 10b as well as the above described washers may be assembled with a screw member with the use of a tool 36. The tool 36 is cylindrical in shape and has a tapering surface 38 over which the washer may be slipped. The end of the surface 38 has a diameter slightly less than the internal diameter of the flange 14b so that the end of the tool may be easily slipped into the washer. As the washer is slipped down on the tool, it is expanded until the internal diameter of the flange portion 34 is greater than the outside diameter of the thread convolutions 26b whereupon the tool may be slipped over the screw shank in the manner shown. Then the washer is slipped off of the tool and into assembled relationship with the screw member.

Fig. 8 shows another slightly modified embodiment of the present invention which is similar to the above described structures as indicated by the application of identical reference numerals with the suffix "c" added to corresponding elements. This embodiment differs from the structure shown in Figs. 1, 2 and 3 only in that an annular mass 40 of sealing material is disposed between the flanges 12c and 14c of the washer. This sealing material may be of any known type which is capable of flowing into sealing engagement with the screw threads and partially into the workpiece aperture when the material is squeezed upon collapsing of the flanges 12c and 14c toward each other. It is understood that the sealing material may also be applied to the above described embodiments of the washer.

While the preferred embodiments of the present invention have been shown and described herein, it is obvious that many structural details may be changed without departing from the spirit and scope of the appended claims.

The invention is claimed as follows:

1. A sheet material split ring lock washer adapted to be preassembled with a headed rotary fastener member having a threaded shank and an unthreaded neck below the fastener head and of less diameter than the external thread diameter; and comprising a pair of helically twisted flanges joined by a helically twisting bight portion and said flanges extending generally radially in axially spaced and opposing relationship from said bight portion, said flanges being of different generally radial lengths with the shorter flange having a diameter not less than the external thread diameter of the shank of the fastener member and with the longer flange having a diameter normally less than the external thread diameter of the shank of the fastener member, the split lock washer permitting expansion of the longer flange to a position outside of the external thread diameter of the shank for assembly of the lock washer with the rotary fastener member and subsequent contraction of the longer flange after assembly to position its internal diameter around the shank adjacent the unthreaded neck of the fastener member and within the external thread diameter of the shank of the fastener member.

2. A sheet material split ring lock washer as claimed in claim 1, wherein there is provided a substantially annular body of flowable sealing material disposed between said flanges and adapted to be squeezed from between the flanges into sealing contact with an inserted fastener member.

3. A sheet material split ring lock washer as claimed in claim 1, wherein the free edge of the shorter flange merges into an additional flange projecting substantially radially outwardly therefrom and axially remote from the longer flange.

4. A sheet material split ring lock washer as claimed in claim 1, wherein the edge portion of the longer flange terminates in a partially reversely bent and generally axially extending margin for increasing resistance of the washer to axial collapsing.

References Cited in the file of this patent

UNITED STATES PATENTS

| | | |
|---|---|---|
| 840,791 | Mohring | Jan. 8, 1907 |
| 1,504,511 | Ross | Aug. 12, 1924 |
| 1,708,799 | Norwood | Apr. 9, 1929 |
| 2,125,878 | Beasley | Aug. 9, 1938 |

FOREIGN PATENTS

| | | |
|---|---|---|
| 318,277 | Germany | Jan. 16, 1920 |